United States Patent
Mays et al.

(10) Patent No.: US 6,887,821 B2
(45) Date of Patent: May 3, 2005

(54) HIGH-TEMPERATURE CATALYST FOR CATALYTIC COMBUSTION AND DECOMPOSITION

(75) Inventors: Jeffrey A. Mays, Woodland Hills, CA (US); Kevin A. Lohner, Los Angeles, CA (US); Kathleen M. Sevener, Los Angeles, CA (US); Jeff J. Jensen, Reseda, CA (US)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 10/405,019

(22) Filed: Apr. 1, 2003

(65) Prior Publication Data

US 2004/0198594 A1 Oct. 7, 2004

(51) Int. Cl.[7] .......................... B01J 23/00; B01J 21/02; B01J 21/08; B01J 21/12; B01J 23/32
(52) U.S. Cl. ...................... 502/202; 502/207; 502/232; 502/237; 502/238; 502/240; 502/241; 502/243; 502/258; 502/262; 502/263; 502/302; 502/324; 502/344; 502/347; 502/348
(58) Field of Search ................................. 502/202, 207, 502/232, 237, 238, 240, 241, 243, 258, 262, 263, 324, 347, 348, 344, 302; 423/584–591, 599, 600, 604; 501/32; 75/235; 148/431

(56) References Cited

U.S. PATENT DOCUMENTS

| | | | | |
|---|---|---|---|---|
| 3,488,962 A | * | 1/1970 | McCormick | 60/218 |
| 3,560,407 A | * | 2/1971 | McCormick | 502/302 |
| 3,884,836 A | * | 5/1975 | Kuhl et al. | 502/241 |
| 3,912,451 A | * | 10/1975 | Gaglia, Jr. | 422/30 |
| 4,214,106 A | * | 7/1980 | Freudenberger et al. | 568/864 |
| 4,238,366 A | * | 12/1980 | Antos | 502/230 |
| 4,601,884 A | * | 7/1986 | Coeckelberghs et al. | 422/113 |
| 4,621,071 A | * | 11/1986 | Blanchard et al. | 502/302 |
| 4,792,435 A | * | 12/1988 | Nakajima | 422/110 |
| 4,888,317 A | * | 12/1989 | DeAngelis et al. | 502/60 |
| H1948 H | * | 3/2001 | Rusek et al. | 502/344 |
| 6,588,199 B2 | * | 7/2003 | Stechman et al. | 60/258 |
| 6,606,853 B2 | * | 8/2003 | Watkins | 60/259 |
| 6,652,248 B2 | * | 11/2003 | Watkins et al. | 417/381 |
| 2003/0207760 A1 | * | 11/2003 | Allen et al. | 502/324 |
| 2004/0013601 A1 | * | 1/2004 | Butz et al. | 423/584 |

* cited by examiner

Primary Examiner—Mark L. Bell
Assistant Examiner—Patricia L. Hailey

(57) ABSTRACT

A robust, high temperature mixed metal oxide catalyst for propellant composition, including high concentration hydrogen peroxide, and catalytic combustion, including methane air mixtures. The uses include target, space, and on-orbit propulsion systems and low-emission terrestrial power and gas generation. The catalyst system requires no special preheat apparatus or special sequencing to meet start-up requirements, enabling a fast overall response time. Start-up transients of less than 1 second have been demonstrated with catalyst bed and propellant temperatures as low as 50 degrees Fahrenheit. The catalyst system has consistently demonstrated high decomposition efficiency, extremely low decomposition roughness, and long operating life on multiple test particles.

53 Claims, 2 Drawing Sheets

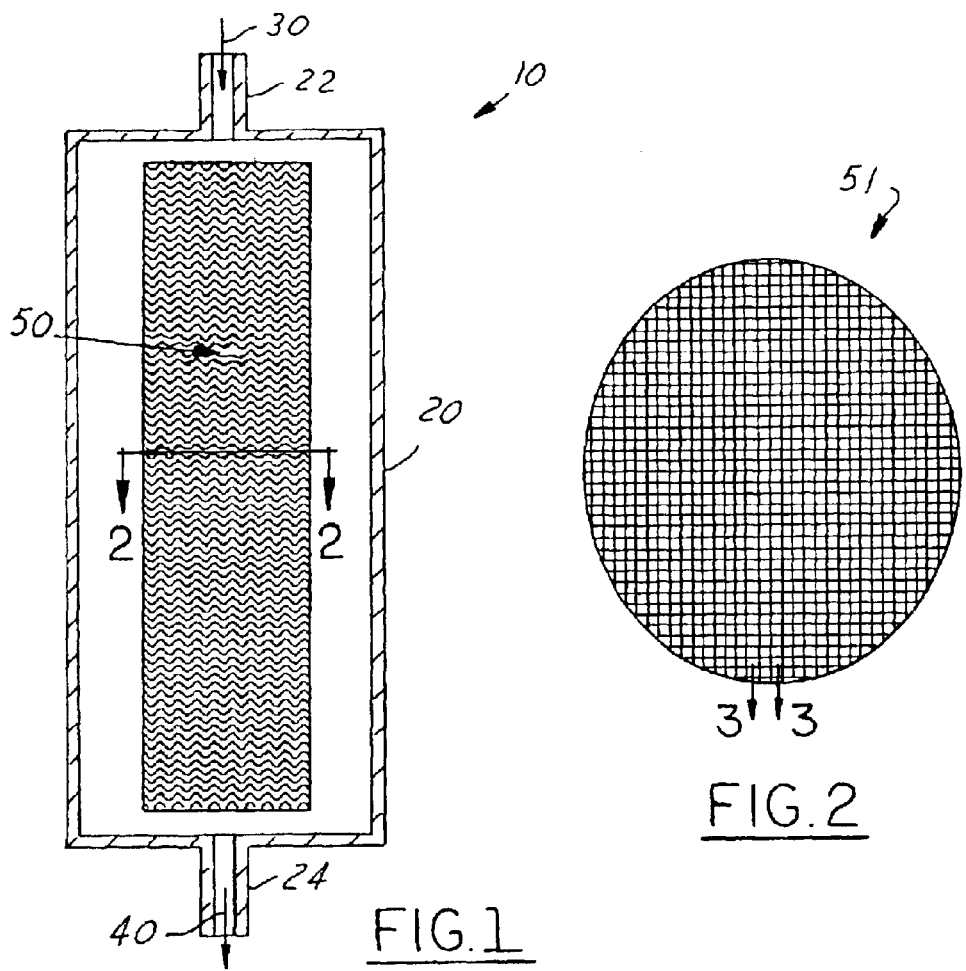
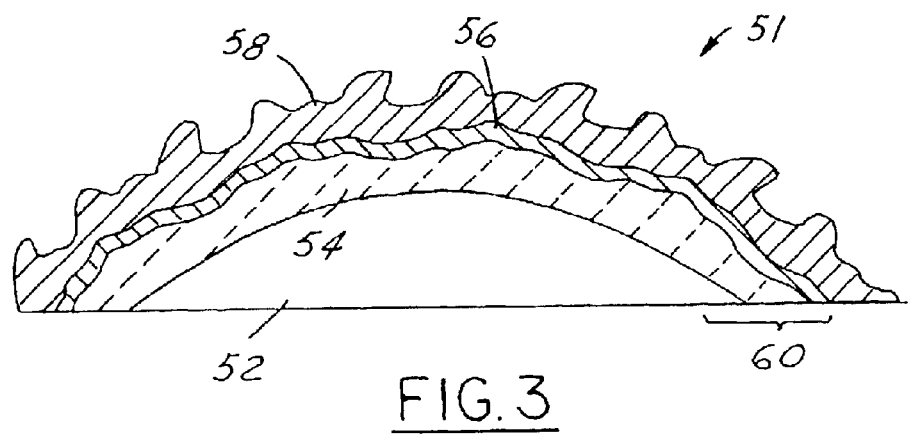

HIGH-TEMPERATURE CATALYST FOR CATALYTIC COMBUSTION AND DECOMPOSITION

STATEMENT REGARDING FEDERALLY SPONSORED RESEARCH

This invention described herein was made in the performance of work under NASA contract No. NCC8-193 and is subject to the provisions of Section 305 of the National Aeronautics and Space Act of 1958 (72 Stat. 435:42 U.S.C. 2457).

TECHNICAL FIELD

The present invention generally relates to propulsion systems and more specifically to high-temperature catalysts for the decomposition of high concentration hydrogen peroxide and the catalytic combustion of hydrocarbon/air mixtures.

BACKGROUND ART

Safer, less toxic propellants that meet operational performance requirements have long been sought by the propulsion industry. The commitment to increasingly safer and lower cost orbit space operations, as evidenced by a central charter of the Space Launch Initiative, has made success in testing less toxic propellants more imperative than ever. Less toxic propulsion systems are being developed to replace engine systems that use more hazardous propellants, such as Nitrogen Tetroxide (NTO) and Monomethyl Hydrazine (MMH).

Hydrogen peroxide offers many potential benefits as a non-toxic propellant source for target, space, and on-orbit applications. Hydrogen peroxide can be decomposed by passing it over a catalyst. The catalyst bed decomposes the hydrogen peroxide to produce super-heated steam and oxygen. The hot gases can be used to drive gas turbines, provide thrust as a monopropellant, provide an oxidizer for bi-propellant systems, or function as an igniter for a rocket engine when combined with fuels like kerosene.

Ninety-eight (98%) percent hydrogen peroxide is an excellent oxidizer for many space applications, both in monopropellant and bipropellant systems, because it is non-cryogenic, has high density, and can be used as a regenerative coolant. However, the high adiabatic decomposition temperature of 98% hydrogen peroxide (1734 degrees Fahrenheit at one atmosphere, versus 1364 degrees Fahrenheit for 90% hydrogen peroxide) causes melting of conventional catalyst systems currently used to decompose 90% hydrogen peroxide.

Beyond traditional silver catalysts, many catalysts are already known for the decomposition of hydrogen peroxide. Metals such as gold, platinum and palladium, in addition to oxides such as manganese dioxide are known to be active catalysts for the decomposition of hydrogen peroxide. However, these catalysts have performance limitations in the decomposition of high concentrations of hydrogen peroxide. These limitations include low melting temperatures, low activity and sensitivity to stabilizers contained in the hydrogen peroxide solutions.

Therefore, there is a need for developing a catalyst system with enhanced temperature capability, high activity and low sensitivity to stabilizers that can safely operate with up to about 99% concentration hydrogen peroxide propellant systems.

Further, a similar need exists for catalyst systems that may be used for the catalytic combustion of hydrocarborn/air mixtures. Such a catalyst system could be used in the power generation or automotive industries for emission control applications.

SUMMARY OF THE INVENTION

The present invention proposes a mixed metal oxide (MMO) material system as a robust, high-activity catalyst for long duration use with up to about 99% concentration hydrogen peroxide propellant systems and with hydrocarborn/air mixtures.

The material systems are available in two preferred types, hereinafter referred to as Type I and Type II catalyst systems. The catalysts are formed as mixtures of powder constituents that are blended together and applied to a substrate material by dipping, painting, spraying, or brushing. The catalyst coated substrate is then heated to bind the catalyst to the substrate. The catalyst then receives an appropriate activation treatment prior to use for decomposing hydrogen peroxide. The potential exists for the claimed catalyst chemistries to be generated through sol gel methods or the calcination of mixtures of metal powders to produce the desired oxides.

The Type I and Type II catalysts offer numerous advantages that make them ideal for propulsion systems as described in the previous paragraph. For example, these catalysts require no special pre-heat apparatus or special sequencing to meet start-up requirements. This enables faster overall response time for the propulsion system. Start up transients consistently less than 1 second have been achieved with catalyst beds containing Type I and II catalysts and subject to propellant temperatures as low as 50 degrees Fahrenheit.

The Type I and II catalysts also have demonstrated high decomposition efficiency and extremely low decomposition roughness (less than +/−1% deviation from average operating pressure) during long operating runs (greater than 10,000 seconds cumulative life) on a single propulsion unit. The Type I and II catalysts are operable with propellant concentrations of between approximately 70 and 99 percent hydrogen peroxide and decomposition temperatures between 500 and 1800 degrees Fahrenheit. A further benefit is that the catalyst has been demonstrated to be quite insensitive to elevated concentrations of contaminants and stabilizers (such as phosphate and tin) that can poison traditional catalysts under ideal conditions.

The MMO catalysts systems are also available for other propellant systems that involve similar decomposition processes. For example, the Type II catalyst system described above may also be used in propellant systems involving the combustion of methane or other gaseous materials with an oxidizer, such as air.

Other objects and advantages of the present invention will become apparent upon considering the following detailed description and appended claims, and upon reference to the accompanying drawings.

BRIEF DESCRIPTION OF THE DRAWINGS

FIG. 1 is schematic of a gas generator assembly according to one preferred embodiment of the present invention;

FIG. 2 is a section view of the catalyst bed portion of FIG. 1 showing a single screen;

FIG. 3 is a section view of FIG. 2 illustrating the various layers of the catalyst system as applied on a single wire of the screen in FIG. 2.

BEST MODES FOR CARRYING OUT THE INVENTION

Figure 4:
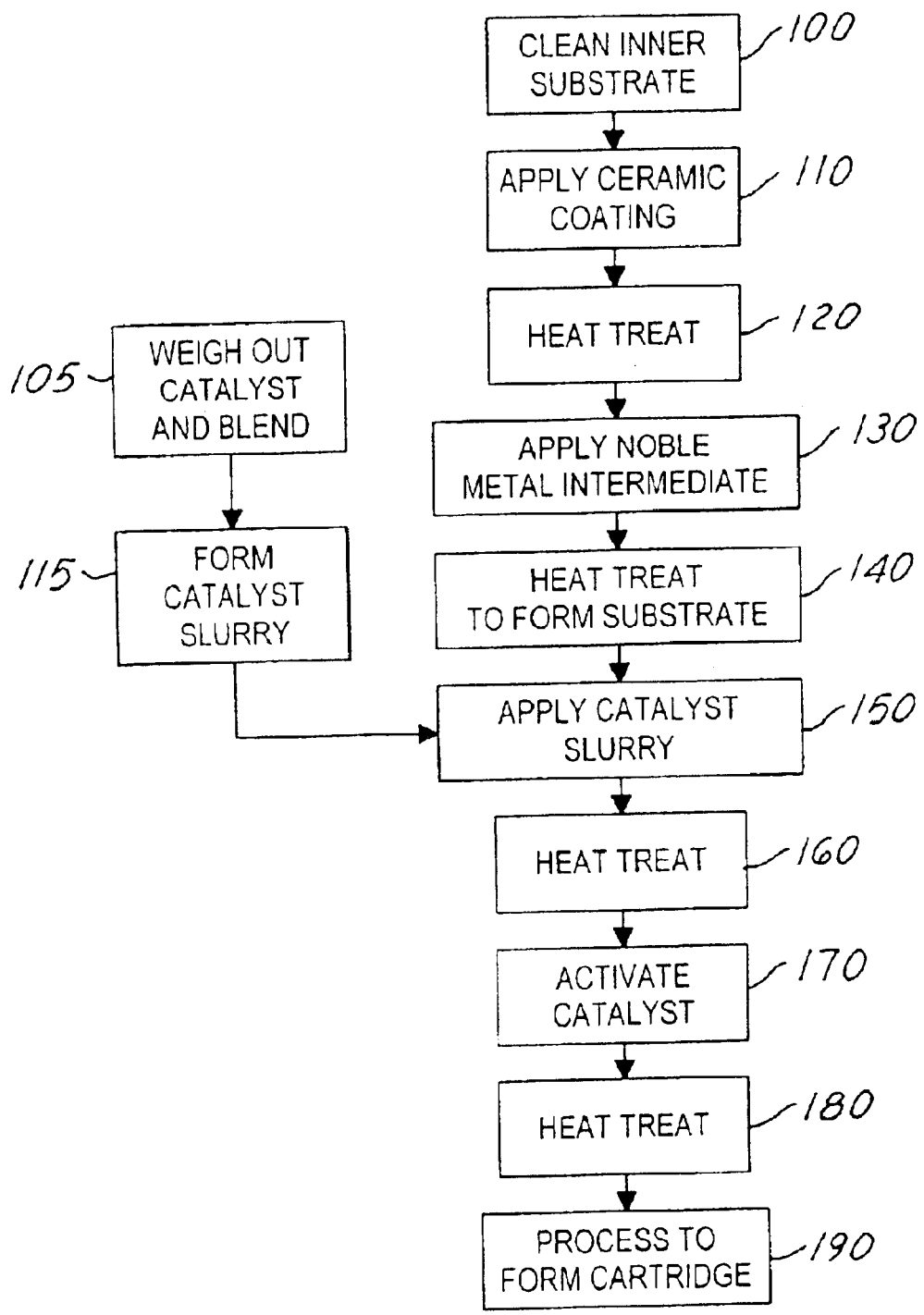
FIG. 4 is a logic flow diagram for forming the Type I or Type II catalyst of FIG. 3 and applying the catalyst to the substrate material.

FIGS. 1–3 illustrate one preferred embodiment of a gas generator assembly 10 used to decompose hydrogen peroxide gas to steam and oxygen that can be subsequently used to drive gas turbines, provide thrust as a monopropellant, provide an oxidizer for bi-propellant systems, or function as an igniter for a rocket engine when combined with fuels like kerosene. The proposed system describes a novel catalyst material 58 that can be used to decompose hydrogen peroxide gas into steam and oxygen.

The design of the assembly 10 described represents potentially infinite designs that may be used and is illustrated here for understanding of the proposed catalyst system 58 and is therefore not intended to be limiting. Preferred unique designs that utilize the proposed catalyst system 58 are also illustrated and described in co-pending U.S. application Ser. No. 10/404,934, which is herein incorporated by reference.

Referring now to FIG. 1, a schematic of a gas generator assembly 10 is shown as having housing 20 consisting of an inlet 22 and an outlet 24. Liquid hydrogen peroxide propellant 30 enters the gas generator assembly through the inlet 22. After passing through the inlet 22, the hydrogen peroxide liquid enters the catalyst bed 50. As will be described further below, a novel catalyst material (shown as 58 in FIG. 3) decomposes the hydrogen peroxide propellant 30 into steam and oxygen, hereinafter referred to as high temperature gas 40, that exits the catalyst bed 50 and exits the gas generator 10 through the outlet 24. The high temperature gas 40 is then used to drive gas turbines, provide thrust as a monopropellant, provide an oxidizer for bi-propellant systems, or function as an igniter for a rocket engine when combined with fuels like kerosene.

In the preferred embodiment, the catalyst bed 50 shown in FIG. 1 is comprised of a stack of catalyst coated wire mesh screens 51. FIG. 2 shows a single wire mesh screen 51 as used in the assembly of the catalyst bed 50 in FIG. 1.

As best shown in FIG. 3, the catalyst-coated screen 51 is comprised of an inner metallic wire substrate 52. The inner metallic substrate 52 is preferably an oxidation resistant alloy. The inner metallic substrate 52 is selected based on numerous factors, including catalyst bed operating temperatures (as determined by the concentration of peroxide 30) and the preferred form of the substrate (which includes wire meshes, tubes or corrugated sheets). Preferred inner metallic substrates 52 for use in high-percentage hydrogen peroxide propellant systems as shown in FIG. 1 include 16-wire mesh, Type 316 stainless steel screens that have high melting temperatures and oxidation resistance. Three preferred stainless steel screens 51 that meet these criteria include CRES 316, CRES 347 and CRES 304, manufactured by Allegheny Ludlum. Another preferred metallic substrate is wire mesh screen of the nickel-based superalloy, Hastelloy C-276, manufactured by Haynes International. (All screens are available from Screen Technology Group, Inc. of Washougal, Wash.)

The metallic substrate 52 is surrounded by a noble metal intermediate 56. The noble metal intermediate 56, or strike, may be a noble metal or noble metal alloy and is used to bond the catalyst 58 to the metallic substrate 52. The metal intermediate 56 may be silver or a silver-palladium alloy.

A ceramic coating 54 may be optionally be added to the metallic substrate 52 prior to introducing the noble metal intermediate 56 depending upon the composition of the metallic substrate 52. The ceramic coating 54 is preferably introduced to provide oxidation protection for the metallic substrate 52 and to prevent alloying between the metallic substrate 52 and noble intermediate 56 during subsequent processing steps requiring high temperatures or during utilization with high concentration peroxide propellants. The ceramic coating 54 preferably is a chrome oxide containing enamel frit. Any enamel frit providing good oxidation prevention may be used. One preferred ceramic coating 54 is Frit A-418, made by Ferro Corporation. The composition of Frit A-418 is shown below in Table 1:

TABLE 1

| CONSTITUENT | PARTS BY WEIGHT |
|---|---|
| XG-201 Frit | 70 |
| 44 wt. % Barium Oxide | |
| 38 wt. % Silicon Oxide | |
| 6.5 wt. % Boron Oxide | |
| 4 wt. % Calcium Oxide | |
| 1.5 wt. % Aluminum Oxide | |
| 1 wt. % Zirconium Oxide | |
| 2 wt. % Zinc Oxide | |
| Green Chrome Oxide | 30 |
| Clay | 5 |
| Water | 48 |

The ceramic coating 54 is surrounded by a noble metal intermediate 56. The noble metal intermediate 56, or strike, may be a noble metal or noble metal alloy and is used to bond the catalyst 58 to the ceramic coating 54. The metal intermediate 56 may be silver or a silver-palladium alloy. For ease of understanding, the inner metallic substrate 52, optional ceramic coating 54, and noble metal intermediate 56 are hereinafter collectively referred to as the prepared substrate material 60.

When the inner metallic substrate 52 comprises a high temperature, oxidation resistant alloy, both the ceramic coating 54 and the noble metal intermediate 56 can be optional. In such a case, the mixed metal oxide catalyst 58 can be applied directly to the inner metallic substrate according to the method outlined below.

The prepared substrate material 60 is then coated with a mixed metal oxide (MMO) catalyst 58. The mixed metal oxide catalyst 58 of the present invention is a robust, high-activity catalyst for long duration use with up to about 99% concentration hydrogen peroxide propellant 30. As such, the catalyst 58 must have a melting temperature greater than the adiabatic decomposition temperature of the hydrogen peroxide propellant 30. Two preferred mixed metal oxide catalyst 58 compositions have been found to achieve these desired results. These are Type I and Type II catalysts as described in co-pending U.S. application Ser. No. 10/404,935. In these systems, silver (Type I) or a silver-palladium alloy (Type II) are the active catalysts, while the manganese oxide and/or dysprosium oxide constitute co-catalysts (promoters). Alumina is also added to the formulation to enhance surface area, while borosilicate glass is added as a structural binder. One preferred borosilicate glass that may be utilized is Pyrex glass, available from Corning. Finally, gold is added as a promoter. The preferred compositions of the Type I and Type II catalysts are shown below in Tables 2 and 3:

TABLE 2

| CONSTITUENT | WEIGHT PERCENTAGE |
| --- | --- |
| Silver (Ag) | 30–50 |
| Manganese Oxide ($MnO_2$) | 20–40 |
| Alumina ($Al_2O_3$) | 10–20 |
| Borosilicate glass | 0–20 |
| Gold (Au) | 0–10 |

TABLE 3

| CONSTITUENT | WEIGHT PERCENTAGE |
| --- | --- |
| Silver Palladium Alloy (70 wt % Ag – 30 wt % Pd) | 30–50 |
| Manganese Oxide ($MnO_2$) | 0–40 |
| Dysprosium Oxide ($Dy_2O_3$) | 0–40 |
| Alumina ($Al_2O_3$) | 10–20 |
| Borosilicate glass | 0–20 |
| Gold (Au) | 0–10 |

FIG. 4 describes a preferred method for forming the Type I and/or Type II mixed metal oxide catalyst 58 coating as shown in FIG. 2. FIG. 4 also describes the method for applying the catalyst 58 to the prepared substrate 60 and the subsequent activation of the catalyst 58. Specific details for applying the Type I and Type II catalyst systems to a metallic substrate are illustrated and described in co-pending U.S. application Ser. No. 10/404,935, which is herein incorporated by reference. The details provided in FIG. 4 and the following text can be used to apply the catalyst systems to both metallic and ceramic substrates.

Referring now to FIG. 4, the process begins in Step 100 by cleaning the inner substrate 52 material to remove inorganic materials or contaminants from the surface of the substrate 52 material. For example, the stainless steel screen material described above in FIGS. 3 and 4 is introduced to a 60 degrees Celsius (140 degree Fahrenheit) alkaline bath for cleaning. A ceramic substrate would be subjected to solvent washes and subsequent heat treatments to remove contaminants and organic materials.

Next, in Step 110, the optional ceramic coating 54 is applied to the inner substrate 52 as a slurry or paste. Application methods include dipping, spraying, brushing, or air-brushing. In Step 120, the ceramic-coated inner substrate is heat treated to adhere the ceramic coating 54 to the inner substrate. For Frit A418, as described in FIG. 3, the coated substrate is heat treated for approximately 14 minutes at about 1060 degrees Celsius (1,940 degrees Fahrenheit). A frit coating is not required for oxidation resistant alloys that do not form excessive oxidation product or react with the intermediate metallic layer described below. The ceramic coating is optional for a ceramic substrate provided the noble metal intermediate 56 does not react with the ceramic substrate.

Next, in Step 130, the noble metal intermediate 56, or strike, is applied to the coated inner substrate 52 or directly to the inner substrate 52. The intermediate 56 as described above is noble metal or noble metal alloy and is applied as a paste or slurry. In Step 140, a subsequent heat treatment binds the intermediate 56 to the coated inner substrate 52 or to the ceramic coating 54, therein forming the prepared substrate 60. Where silver is used as the intermediate 54, the heat treatment of Step 140 is done at about 925 degrees Celsius (1700 degrees Fahrenheit) to drive off any organic solvents and to fuse the silver to the ceramic coating 54.

In Step 105, the constituent dry powders of the catalyst 58 as described in either Table 2 or Table 3 above are weighed out and placed in a suitable container for blending. The powders of each constituent should not exceed about 10 microns to ensure good catalytic activity. The actual powder size is dependent upon the actual application method chosen below.

Next, in Step 115, an organic solvent, combined with an oil-based surfactant, is mixed with the blended powders to generate a slurry of uniform consistency. The viscosity of the slurry should be adjusted based on the type of application process so as to allow application of a uniform coating layer.

Next, in Step 150, the slurry composition is applied to the prepared substrate 60 to a uniform thickness. The slurry composition may be applied in any number of preferred processes known in the art, including dipping, painting, spraying, or brushing. The slurry composition is then allowed to dry to the substrate 60 to remove the organic solvent. Gentle heating may also be used to volatilize any remaining solvent material.

Next, in Step 160, the catalyst-coated substrate is heat treated to bind the mixed metal oxide catalyst material 58 to the substrate 60. To achieve this, the catalyst-coated substrate is introduced to an air furnace oven that is initially kept at about 150 degrees Celsius (300 degrees Fahrenheit). The furnace temperature is slowly increased to between approximately 840 and 1040 degrees Celsius (1550–1900 degrees Fahrenheit) for about 30 to 240 minutes, depending upon the formulation of the catalyst material 58. After the prescribed hold, the part is slowly cooled to room temperature in an air atmosphere. After firing, the catalyst coating should be uniform in appearance.

Next, in Step 170, the mixed metal oxide catalyst 58 receives an appropriate activation treatment. Next, in Step 180, the applied activation treatment is calcined in an air furnace. The process of Steps 170 and 180 may be repeated as desired.

For metallic substrates with the Type I catalyst system applied, the activation treatment consists of a samarium nitrate hexahydrate solution. The solution is prepared and applied to the catalyst-coated substrate by dipping, brushing, spraying or air-brushing and allowed to dry. After drying, the solution is calcined in an air furnace for approximately 30 minutes at about 350 degrees Fahrenheit (about 175 degrees Celsius). The process is repeated for a total of between 3 and 5 calcining cycles.

The samarium activation process deposits a discontinuous film of samarium oxide on the catalyst. The discontinuous film appears to prevent large gas bubbles from evolving during the decomposition process and adhering to the catalyst surface creating gas pockets. Such gas pockets prevent the liquid hydrogen peroxide from reaching the catalyst surface, thereby decreasing catalytic surface area and overall efficiency. The process is similar to the activation process described in U.S. Pat. No. 3,560,407 to McCormick, which is herein incorporated by reference.

For metallic substrates with the Type II catalyst system applied, the activation treatment consists of a noble metal loaded nitric acid solution. The solution is prepared by fully dissolving a portion of the silver-palladium alloy (shown in Table 2 above) in concentrated nitric acid. The solution is then applied to the catalyst-coated substrate by dipping, brushing, spraying or air-brushing and allowed to dry. After drying, the solution is calcined in an air furnace for approximately 20 minutes at about 450 degrees Fahrenheit (about 230 degrees Celsius). The process is repeated for a total of between 2 and 5 calcining cycles.

The nitric acid solution is loaded with a noble metal, in this case a silver-palladium alloy, to insure that silver and palladium nitrates are deposited on the catalyst surface. The solution will further dissolve some of the silver-palladium in the catalyst, but the pre-loading of the solution ensures sufficient silver and palladium nitrate concentrations in the solution and prevents excessive dissolution of the active catalytic agents from the catalyst mixture. During calcination, silver and palladium oxides are formed from the nitrates deposited on the catalyst surface. It is believed that these oxides assist in initiating the decomposition process. Palladium oxide is well known as a low temperature dehydrogenation catalyst. The process is similar to the activation process described in U.S. Pat. No. 3,560,407, which his herein incorporated by reference.

In addition, the catalysts 58 as described above can be used in other propellant decomposition systems. For example, the Type II catalyst, applied to a metallic substrate, has been used in the catalytic combustion of methane. This indicates that these catalysts may be used in the catalytic combustion or decomposition of other hydrocarbon propellants.

The invention will be explained in further detail with the aid of an example of an embodiment.

EXAMPLE

Catalyst A of the catalyst system Type I was prepared by dry blending 40 grams of silver powder, 16.03 grams of fine alumina powder, 32.04 grams of manganese oxide powder, 9.75 grams of Pyrex glass powder, and 2.18 grams of gold powder in a glass jar. The Catalyst A mixture was blended with a glass stirring rod until the powder mixture had a uniform consistency and color. In a separate container, a mineral oil was added to toluene in a ratio of 10 drops of mineral oil for every 4.5 grams of toluene to form a solvent solution. The blended solvent solution was added to the dry Catalyst A powder mixture to form a slurry. The solvent solution was blended into the Catalyst A powder using a glass stirring rod to ensure full wetting of the powder mixture and uniform consistency. The amount of solution added to the powder mixture was varied to alter the final Catalyst A slurry viscosity and ultimately the thickness of the Catalyst A coating on the substrate.

In the preferred embodiment for decomposing high concentrations of hydrogen peroxide, the Catalyst A slurry was applied to a metallic screen substrate, as described in co-pending U.S. application Ser. No. 10/404,939 and the Catalyst A coated screens were incorporated into the catalyst bed of a gas generator, as described in co-pending U.S. application Ser. No. 10/404,935. A gas generator device, containing a catalyst bed, containing screens coated with Catalyst A was successfully operated for a total 4903 seconds, decomposing 185 gallons of 98% hydrogen peroxide during 41 tests. At conclusion of the testing, the gas generator was still performing well with combustion efficiency of greater than about 97%.

While the invention has been described in terms of preferred embodiments, it will be understood, of course, that the invention is not limited thereto since modifications may be made by those skilled in the art, particularly in light of the foregoing teachings.

What is claimed is:

1. A robust, high-activity catalyst for use in high-temperature decomposition of propellants, including 70–99% hydrogen peroxide, the catalyst comprising:
    about 30 to 50 weight percent of silver;
    about 20 to 40 weight percent of manganese dioxide; and
    about 10 to 20 weight percent of alumina.

2. The catalyst of claim 1 further comprising about 0 to 20 weight percent of borosilicate glass.

3. The catalyst of claim 1 further comprising about 0 to 10 weight percent of gold.

4. The catalyst of claim 1 further comprising about 0 to 20 weight percent of borosilicate glass and about 0 to 10 weight percent of gold.

5. A robust, high-activity catalyst for use in high-temperature decomposition of propellants, including 70–99% hydrogen peroxide, the catalyst comprising:
    about 30 to 50 weight percent of silver-palladium alloy;
    about 0 to 40 weight percent of manganese dioxide;
    about 0 to 40 weight percent of dysprosium oxide; and
    about 10 to 20 weight percent of alumina.

6. The catalyst of claim 5 further comprising about 0 to 20 weight percent of borosilicate glass.

7. The catalyst of claim 5 further comprising about 0 to 10 weight percent of gold.

8. The catalyst of claim 5 further comprising about 0 to 20 weight percent of borosilicate glass and about 0 to 10 weight percent of gold.

9. A method for forming a robust, high-temperature catalyst material for use in decomposing propellants or catalytic combustion in the power and propulsion industry, the method comprising:
    (a) forming a mixture of a plurality of constituents within a container, said mixture comprising:
        a first amount of an active catalyst material to a container, said first amount comprising between approximately 30 and 50 weight percent of the total weight of said mixture;
        a second amount of a co-catalyst promoter material to said container, said second amount comprising between approximately 20 and 40 weight percent of the total weight of said mixture;
        a third amount of a surface enhancer material to said container, said third amount comprising between approximately 10 and 20 weight percent of the total weight of said mixture; and
    (b) dry blending said mixture within said container to a uniform consistency.

10. The method of claim 9 further comprising introducing a structural binder material to said mixture, said structural binder material comprising less than about 20 weight percent of said mixture.

11. The method of claim 10, wherein said structural binder material comprises borosilicate glass.

12. The method of claim 9 further comprising introducing a promoter material to said mixture, said promoter material comprising less than about 10 weight percent of said mixture.

13. The method of claim 12, wherein said promoter material comprises gold.

14. The method of claim 9, wherein said active catalyst material comprises silver.

15. The method of claim 14, wherein said co-catalyst promoter material comprises manganese dioxide.

16. The method of claim 9, wherein said active catalyst material comprises a silver palladium alloy.

17. The method of claim 16, wherein said co-catalyst promoter material comprises manganese dioxide.

18. The method of claim 16, wherein said catalyst promoter material comprises dysprosium dioxide.

19. The method of claim 16, wherein said co-catalyst promoter material is selected from the group consisting of manganese dioxide, dysprosium dioxide, and combinations thereof.

20. The method of claim 9, wherein each constituent of said mixture has an average particle size of less than 10 microns in diameter.

21. A robust, high-activity activated catalyst for use in high-temperature decomposition of propellants, including 70–99% hydrogen peroxide, the activated catalyst comprising:
a catalyst having about 30 to 50 weight percent of silver, about 20 to 40 weight percent of manganese dioxide, and about 10 to 20 weight percent of alumina;
an activation treatment applied to said catalyst, said activation treatment comprising a samarium nitrate hexahydrate solution.

22. The activated catalyst of claim 21, wherein said catalyst further comprising about 0 to 20 weight percent of borosilicate glass.

23. The activated catalyst of claim 21, wherein said catalyst further comprising about 0 to 10 weight percent of gold.

24. The activated catalyst of claim 21, wherein said catalyst further comprising about 0 to 20 weight percent of borosilicate glass and about 0 to 10 weight percent of gold.

25. The activated catalyst of claim 21, wherein said activation treatment is calcined to said catalyst for between 4 and 6 calcining cycles.

26. A robust, high-activity activated catalyst for use in high-temperature decomposition of propellants, including 70–99% hydrogen peroxide, the activated catalyst comprising:
a catalyst comprising about 30 to 50 weight percent of silver-palladium alloy, about 0 to 40 weight percent of manganese dioxide, about 0 to 40 weight percent of dysprosium oxide, and
about 10 to 20 weight percent of alumina; and
an activation treatment applied to said catalyst, said activation treatment comprising a noble metal loaded nitric add solution.

27. The activated catalyst of claim 26, wherein said catalyst further comprising about 0 to 20 weight percent of borosilicate glass.

28. The catalyst of claim 26, wherein said catalyst further comprising about 0 to 10 weight percent of gold.

29. The activated catalyst of claim 26, wherein said activation treatment is calcined to said catalyst for between 4 and 6 calcining cycles.

30. A method for forming a robust, high-temperature activated catalyst material for use in decomposing propellants or catalytic combustion in the power and propulsion industry, the method comprising:
(a) forming a mixture of a plurality of constituents within a container, said mixture comprising:
a first amount of an active catalyst material to a container, said first amount comprising between approximately 30 and 50 weight percent of the total weight of said mixture;
a second amount of a co-catalyst promoter material to said container, said second amount comprising between approximately 20 and 40 weight percent of the total weight of said mixture;
a third amount of a surface enhancer material to said container, said third amount comprising between approximately 10 and 20 weight percent of the total weight of said mixture;
(b) dry blending said mixture within said container to a uniform consistency;
(c) applying said mixture to a prepared substrate; and
(d) activating said mixture to form an activated catalyst material.

31. The method of claim 30 further comprising introducing a structural binder material to said mixture, said structural binder material comprising less than about 20 weight percent of said mixture.

32. The method of claim 31, wherein said structural binder material comprises borosilicate glass.

33. The method of claim 30 further comprising introducing a promoter material to said mixture, said promoter material comprising less than about 10 weight percent of said mixture.

34. The method of claim 33, wherein said promoter material comprises gold.

35. The method of claim 30, wherein said active catalyst material comprises silver.

36. The method of claim 35, wherein said co-catalyst promoter material comprises manganese dioxide.

37. The method of claim 35, wherein activating said mixture to form an activated catalyst material comprises:
(d) applying a samarium nitrate hexahydrate solution to said mixture;
(e) calcining said samarium nitrate hexahydrate solution to said mixture; and
(f) repeating step (e) between 3 and 5 times.

38. The method of claim 37, wherein (d) applying a samarium nitrate hexahydrate solution to said mixture comprises:
dipping said mixture within a samarium nitrate hexahydrate solution; and
drying said samarium nitrate hexahydrate solution onto said mixture.

39. The method of claim 37, wherein (d) applying a samarium nitrate hexahydrate solution to said mixture comprises:
brushing said mixture with a samarium nitrate hexahydrate solution; and
drying said samarium nitrate hexahydrate solution onto said mixture.

40. The method of claim 37, wherein (d) applying a samarium nitrate hexahydrate solution to said mixture comprises;
spraying said mixture with a samarium nitrate hexahydrate solution; and
drying said samarium nitrate hexahydrate solution onto said mixture.

41. The method of claim 37, wherein (d) applying a samarium nitrate hexahydrate solution to said mixture comprises:
air-brushing said mixture with a samarium nitrate hexahydrate solution; and
drying said samarium nitrate hexahydrate solution onto said mixture.

42. The method of claim 37, wherein (e) calcining said samarium nitrate hexahydrate solution to said mixture comprises (e) introducing said mixture having said applied activation treatment to an air furnace for about thirty minutes at a temperature of about 175 degrees Celsius.

43. The method of claim 30, wherein said active catalyst material comprises a silver palladium alloy.

44. The method of claim 43, wherein said catalyst promoter material comprises manganese dioxide.

45. The method of claim 43, wherein said co-catalyst promoter material comprises dysprosium dioxide.

46. The method of claim 43, wherein said co-catalyst promoter material is selected from the group consisting of manganese dioxide, dysprosium dioxide, and combinations thereof.

47. The method of claim 43, wherein activating said mixture to form an activated catalyst material comprises:
  (d) applying a noble metal loaded nitric acid solution to said mixture, said noble metal loaded nitric acid solution comprising a portion of a silver palladium alloy of said catalyst dissolved in a concentrated nitric acid solution;
  (e) calcining said noble metal loaded nitric acid solution to said mixture; and
  (f) repeating-step (e) between 2 and 5 times.

48. The method of claim 47, wherein (d) applying a noble metal loaded nitric acid solution to said mixture comprises:
  dipping said mixture within noble metal loaded nitric acid solution; and
  drying said noble metal loaded nitric add solution onto said mixture.

49. The method of claim 47, wherein (d) applying a noble metal loaded nitric acid solution to said mixture comprises:
  brushing said mixture with a noble metal loaded nitric acid solution; and
  drying said noble metal loaded nitric acid solution onto said mixture.

50. The method of claim 47, wherein (d) applying a noble metal loaded nitric acid solution to said mixture comprises:
  spraying said mixture with a noble metal loaded nitric acid solution; and
  drying said noble metal loaded nitric acid solution onto said mixture.

51. The method of claim 47, wherein (d) applying a noble metal loaded nitric acid solution to said mixture comprises:
  air-brushing said mixture with a noble metal loaded nitric acid solution; and
  drying said noble metal loaded nitric acid solution onto said mixture.

52. The method of claim 47, wherein (e) calcining said noble metal loaded nitric acid solution to said mixture comprises (e) introducing said mixture having said applied activation treatment to an air furnace for about twenty minutes at a temperature of about 230 degrees Celsius.

53. The method of claim 30, wherein each constituent of said mixture has an average particle size of less than 10 microns in diameter.

* * * * *